(12) United States Patent
Baek et al.

(10) Patent No.: US 11,588,631 B2
(45) Date of Patent: Feb. 21, 2023

(54) SYSTEMS AND METHODS FOR BLOCKCHAIN-BASED AUTOMATIC KEY GENERATION

(71) Applicants: Jaejong Baek, Tempe, AZ (US);
Sukwha Kyung, Tempe, AZ (US);
Gail-Joon Ahn, Tempe, AZ (US)

(72) Inventors: Jaejong Baek, Tempe, AZ (US);
Sukwha Kyung, Tempe, AZ (US);
Gail-Joon Ahn, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 17/067,426

(22) Filed: Oct. 9, 2020

(65) Prior Publication Data
US 2021/0143995 A1 May 13, 2021

Related U.S. Application Data

(60) Provisional application No. 62/912,985, filed on Oct. 9, 2019.

(51) Int. Cl.
*H04L 9/08* (2006.01)
(52) U.S. Cl.
CPC .................. *H04L 9/0869* (2013.01)
(58) Field of Classification Search
CPC .................................. H04L 9/0869
USPC ........................................ 713/168
See application file for complete search history.

(56) References Cited

U.S. PATENT DOCUMENTS

| | | | |
|---|---|---|---|
| 10,447,481 B2 | 10/2019 | Tu et al. | |
| 10,454,677 B1* | 10/2019 | Nagelberg | H04L 9/0643 |
| 2014/0230012 A1 | 8/2014 | Ahn | |
| 2019/0207759 A1* | 7/2019 | Chan | H04L 9/0819 |
| 2019/0273610 A1* | 9/2019 | Fan | H04L 9/3239 |
| 2020/0136809 A1* | 4/2020 | Newman | H04L 9/3239 |
| 2020/0356989 A1* | 11/2020 | Shamai | H04L 9/0662 |
| 2020/0379977 A1* | 12/2020 | Saket | G06Q 30/0282 |
| 2020/0389294 A1* | 12/2020 | Soundararajan | G06Q 20/36 |
| 2021/0143995 A1* | 5/2021 | Baek | H04L 9/3247 |

OTHER PUBLICATIONS

Wright et al., 2017 IEEE International Conference on Big Data, "Sustainable blockchain-enabled services: Smart contracts", pp. 1-10 (Year: 2017).*
Wright et al., 2019 IEEE 16th International Multi-Conference on Systems, "Agent-based Turing Complete Transactions integrating feedback within a Blockchain System", pp. 300-308 (Year: 2019).*
Ahmed et al., "Turning Trust Around: Smart Contract-Assisted Public Key Infrastructure," 2018 17th IEEE International Conference On Trust, Security And Privacy In Computing And Communications/ 12th IEEE International Conference On Big Data Science And Engineering (TrustCom/BigDataSE), New York, NY, 2018, pp. 104-111.

(Continued)

*Primary Examiner* — Khalil Naghdali
(74) *Attorney, Agent, or Firm* — Polsinelli PC

(57) ABSTRACT

An embodiment of a blockchain-based cryptographic key generation method and system that leverages existing values locally available within a distributed ledger to generate cryptographic keys independent of a third-party server is disclosed herein.

10 Claims, 8 Drawing Sheets

(56) References Cited

OTHER PUBLICATIONS

Lin, Q. et al., "An ID-Based Linearly Homomorphic SignatureScheme and Its Application in Blockchain", IEEE Access, May 2018 [IEEE date of publication: Feb. 2018], vol. 6, pp. 20632-20640 <DOI:10.1109/ACCESS.2018.2809426>.

Longo et al., "On the security of the blockchain BIX protocol and certificates," 2017 9th International Conference on Cyber Conflict (CyCon), Tallinn, 2017, pp. 1-16.

Muftic, Sead. "BIX Certificates: Cryptographic Tokens for Anonymous Transactions Based on Certificates Public Ledger." Ledger, [S.I.], v. 1, p. 19-37, Dec. 2016.

Ouaddah, A. et al., "FairAccess: a new Blockchain-based access controlframework for the Internet of Things", Security and Communication Networks, Dec. 2016, vol. 9, No. 18, pp. 5943-5964 <DOI:10.1002/sec.1748>.

\* cited by examiner

SYSTEMS AND METHODS FOR BLOCKCHAIN-BASED AUTOMATIC KEY GENERATION

CROSS REFERENCE TO RELATED APPLICATIONS

This is a non-provisional application that claims benefit to U.S. provisional application Ser. No. 62/912,985 filed on Oct. 9, 2019, which is herein incorporated by reference in its entirety.

FIELD

The present disclosure generally relates to cryptographic key generation, and in particular, to systems and methods for decentralized cryptographic key generation for improved cyber-security.

BACKGROUND

Cryptographic key generation usually relies on a "shared secret" to be generated in communication with a central server and shared across a network in order to safely exchange electronic information. However, this can cause issues with key re-generation if the shared secret is exposed or otherwise compromised, leading to delays and system failures in mission-critical services like military operations and medical or financial systems. Under a conventional key generation environment, when a key is exposed, it takes a lot of time to exchange the secret and generate new key pairs across the network.

Blockchain is a decentralized, shared system that records every transaction made by participating entities across the network so that any record cannot be altered retroactively. In private and permissioned blockchain networks, Public Key Infrastructure (PKI) is adopted as a cryptographic key management technique that enables all components to securely communicate in an insecure public network and verify the identity of other entities via digital signatures. The certificates used in PKI are verified by a central management entity called Certificate Authority (CA) that verifies and signs the certificates. However, utilization of a centralized verification server in PKI is computationally intensive.

If a secret key is compromised or exposed accidentally, the secret must be shared again among all nodes to regenerate the new keys and certificates. However, the process of renewing and exchanging key secrets will cause delay, which can be a fatal obstacle causing system failure in time-sensitive and mission-critical systems. Generally, in systems and services which utilize keys and certificates (e.g., smart cars, financial, and medical, etc.), the devices and services hardly have sufficient time to generate new keys using a shared secret by communicating to the central server while maintaining the on-going session. Therefore, any delays incurred by key generation and sharing can interrupt the service provisioning or even cause a system failure in real-time processing required system.

In order to mitigate the gap between security requirement and performance, the PKI system needs to be reconsidered and redesigned for an upcoming Internet-of-Things (IoT) computing and hyper-connected environment that are based on cutting-edge technologies such as Blockchain and 5G network technologies. Especially, 5G (the fifth generation of cellular network) is becoming a revolutionary technology that supports massive machine-level communication connecting various IoT devices. 5G supports instant communications with high bandwidth, ultra-low latency, and massive connectivity for new applications such as mobile devices, health management systems, autonomous vehicles, and smart homes. However, to meet the requirement of the ultra-low latency in mission-critical, time-sensitive systems, such as systems which will use 5G, the delay incurred by current PKI must be minimized, or even removed without compromising the same degree of security provided by PKI.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
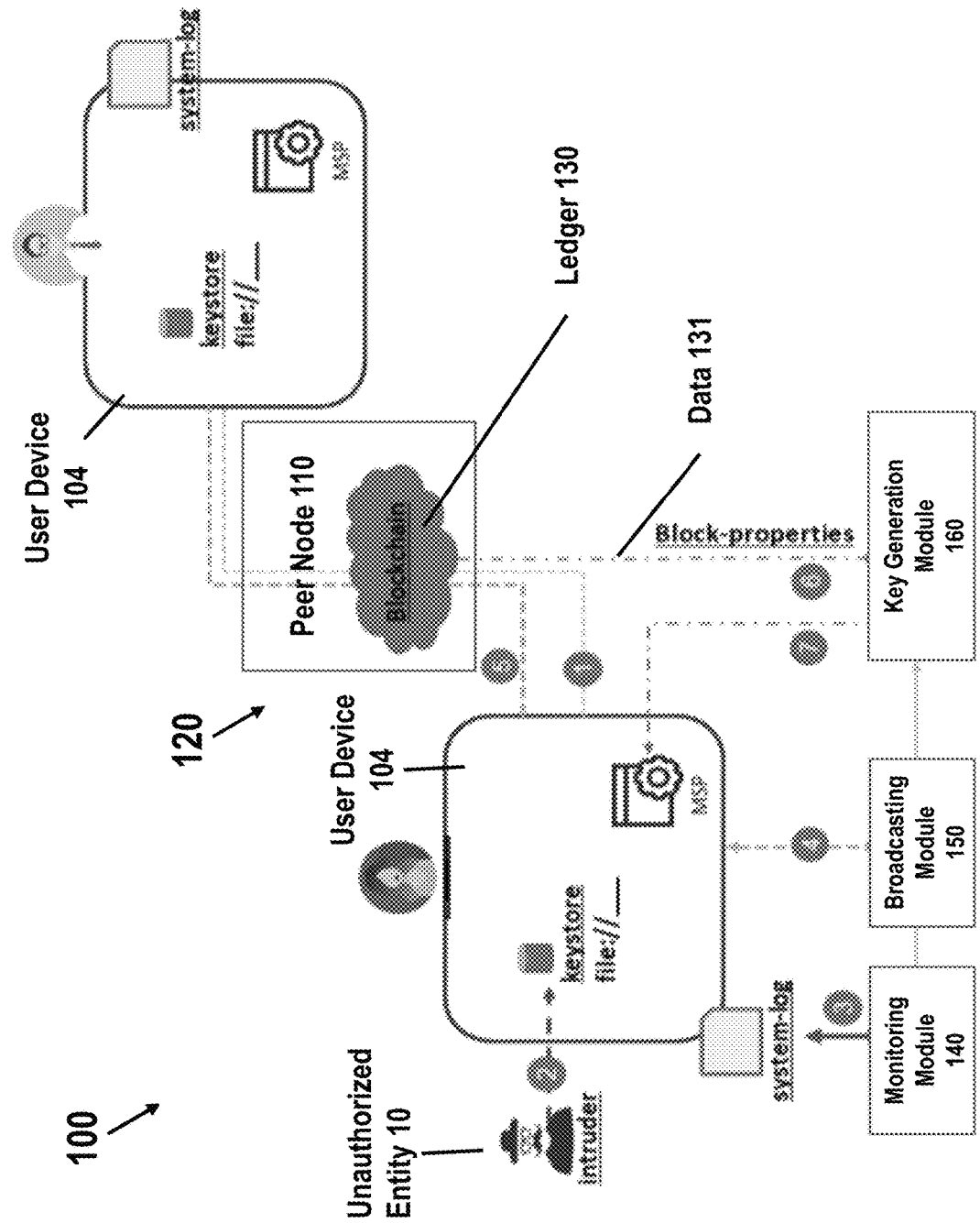
FIG. 1 is a diagram illustrating a system for key generation within a blockchain framework using a distributed ledger.

A decentralized cryptographic key generation system and associated method for use in time-sensitive and mission-critical services is disclosed herein. Compared to conventional methods which exchange a "shared secret" before key generation, the present system leverages dynamic metadata included in a shared transaction ledger as a secret for key generation without exchanging any shared secret and without the need for contacting a third party to issue a key. The dynamic metadata derived from shared ledgers is used as a seed to generate the key. In particular, the dynamic metadata is selected for attributes including commonality between users, randomness and uniqueness due to decentralization, immutability, and transparency of Blockchain technology. These factors guarantee that metadata included in ledgers can be utilized as a seed for key generation. Referring to the drawings, embodiments of a cryptographic key generation method are illustrated and generally indicated as 100 in FIGS. 1-8.

Figure 2:
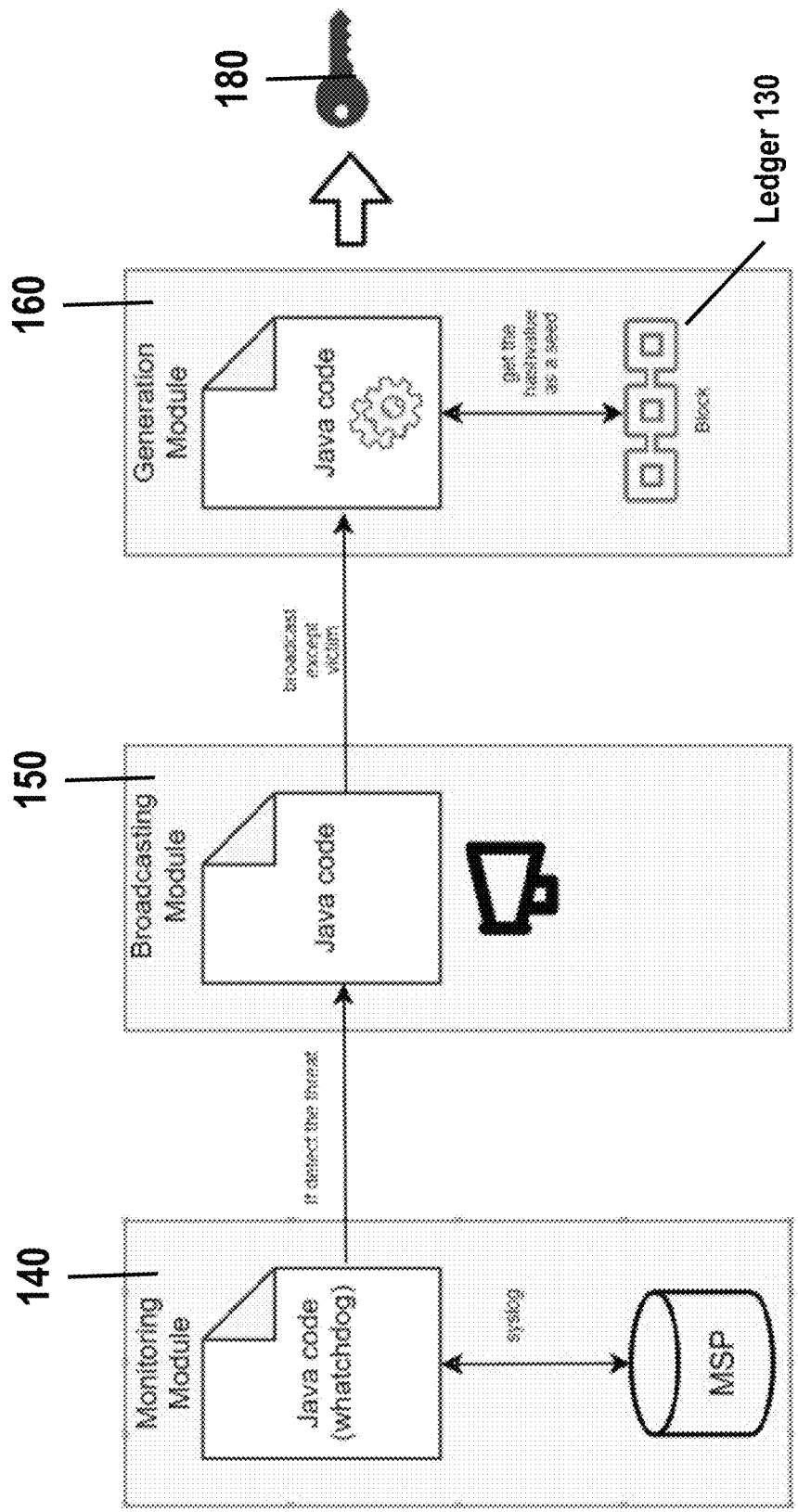
FIG. 2 is a diagram illustrating a monitoring module, a broadcasting module, and a key generation module for key generation using the system of FIG. 1.

As shown in FIGS. 1 and 2, a system 100 for facilitating secure transactions is shown. In particular, the system 100 facilitates secure transactions between one or more users 102 through a blockchain framework 120 by enabling local cryptographic key generation using dynamic metadata 131 stored within a distributed ledger 130 of the blockchain framework 120. In some embodiments, the system 100 is operable to generate new cryptographic keys 180 in response to threats by an unauthorized entity 10. As shown, if the unauthorized entity 10 or unauthorized activity is detected by a monitoring module 140 local to each user 102, then an alert is sent out to other users 102 by a broadcasting module 150. When other users 102 receive the alert, a new cryptographic key 180 is generated by key generation module 160 using the dynamic metadata 131 stored within the ledger 130. The key 180 can be used for encrypting or decrypting block contents within the ledger 130 to ensure secure transactions within the ledger 130.

In the present system 100, dynamic metadata 131 is selected from the ledger 130 to generate the key 180 based on requirements for key primitives including randomness and commonality from the ledger 130 including values from the World State, Block, and Transaction sections of the ledger 130 without 3rd server assistance. In this way, by minimizing the delay and message costs, users within the present system 100 don't need to exchange keys or otherwise communicate with a centralized third server. Further, the present system 100 allows seamless communication in time-sensitive or mission-critical systems by allowing secure cryptographic key generation using less technical overhead than previous methods. In some cases, the present system 100 can generate a dynamic transitory value more than once within a single session where the sender generates only one static key pair per message. The present system 100 can also be leveraged to construct a certificate and verify the certificate with a newly-generated authentication or signature key. Lastly, the present method can be used to generate a key-wrapping key to protect pre-shared keys or certificates against modification and unauthorized disclosure.

Figure 3:
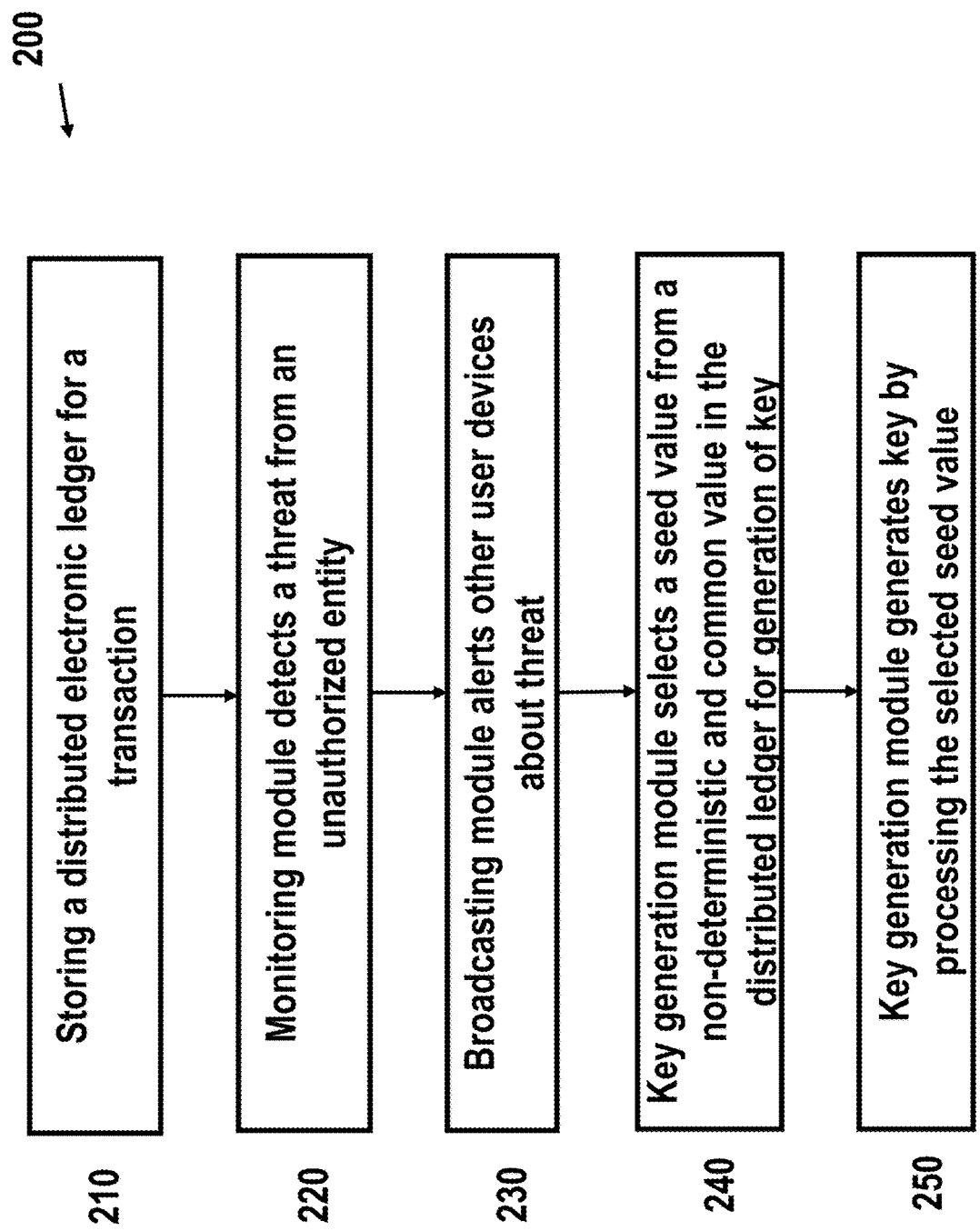
FIG. 3 is a flowchart illustrating a key generation method that is performed using the system of FIG. 1.

Referring to FIGS. 2 and 3, a method 200 for use with the system of FIG. 1 is shown. At block 210, a distributed electronic ledger for a transaction is stored on data storage devices associated with each user 102. At block 220, an unauthorized entity 10 is detected by the monitoring module 140. At block 230, the broadcasting module 150 immediately broadcasts an alert to other users 102 within the system 100. At block 240, the key generation module 160 selects a seed value from the dynamic metadata 131 stored within the ledger 130. At block 250, a key 180 is generated using the seed value, and the key 180. The key 180 can be used for encrypting and decrypting of data within the ledger 130 to prevent the unauthorized entity 10 or other hostile entities from accessing information stored within the ledger 130.

Figure 4:
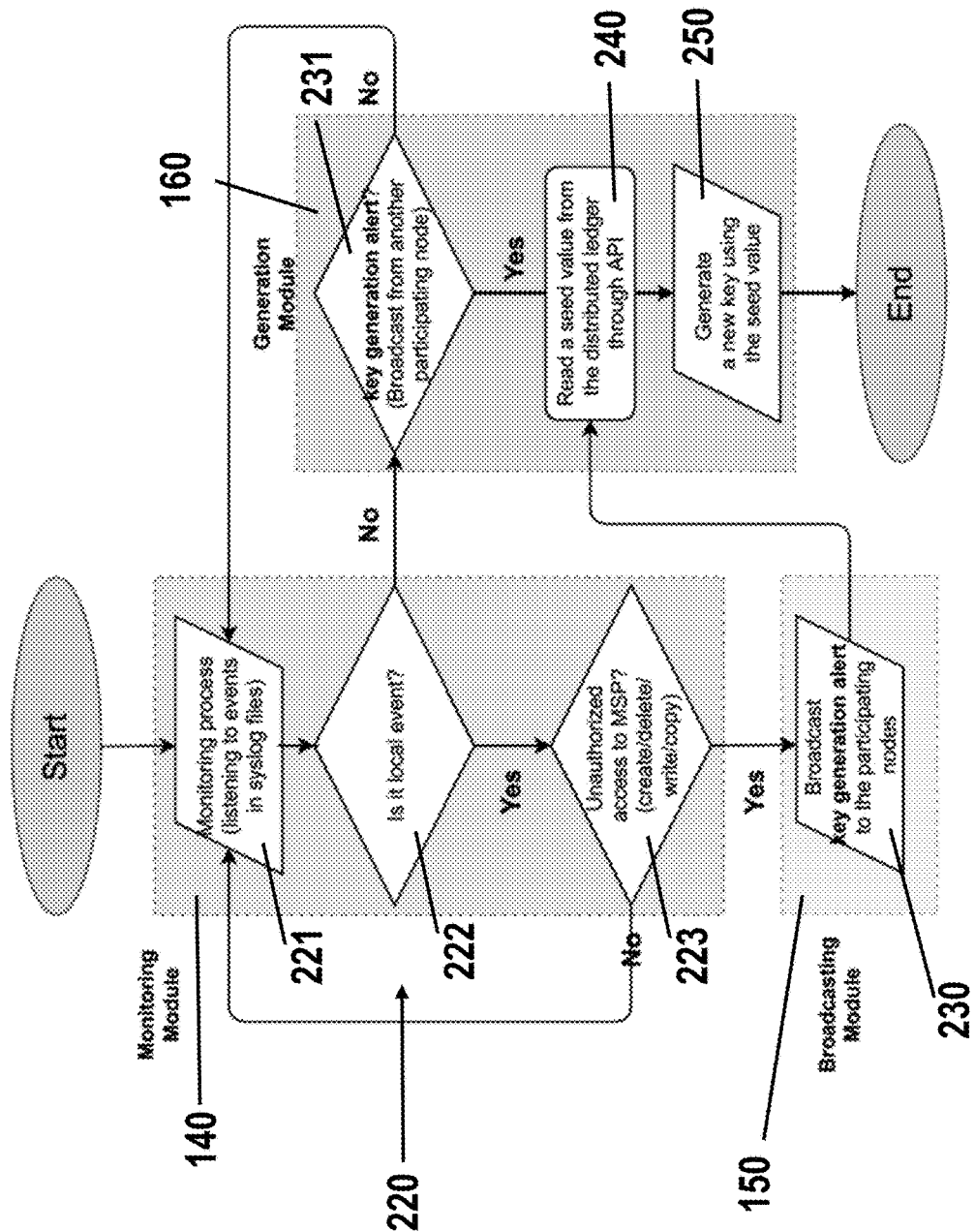
FIG. 4 is a flowchart further illustrating the key generation method of FIG. 3.

FIG. 4 further shows sub-steps of the method 200 in terms of the monitoring module 140, the broadcasting module 150 and the key generation module 160. At block 221, the monitoring module 140 monitors activity by listening to events in syslog files. At block 222, the monitoring module 140 checks if a particular event detected in syslog files is a local event. If the event is not a local event, then at block 231 the key generation module 160 in communication with the monitoring module 140 checks for a key generation alert from other nodes in the blockchain framework 120. If at block 222 the event is a local event, then at block 223 the monitoring module 140 checks if the event is indicative of unauthorized access to a membership service provider (MSP) of the blockchain framework 120 (i.e. if files are created, deleted, copied, or altered without permission). If unauthorized access is not detected, then the monitoring module 140 returns to block 221 to continue monitoring. If unauthorized access is detected, then at block 230 the broadcasting module 150 in communication with the monitoring module 140 broadcasts a key generation alert to participating nodes within the blockchain network 120. At block 240, following the key generation alert, the key generation module 160 selects a seed value from a non-deterministic and common value in the ledger 130 for generation of key 180 through an API. Then, at block 250, a new key 180 is generated using the seed value selected in block 240.

Figure 5:
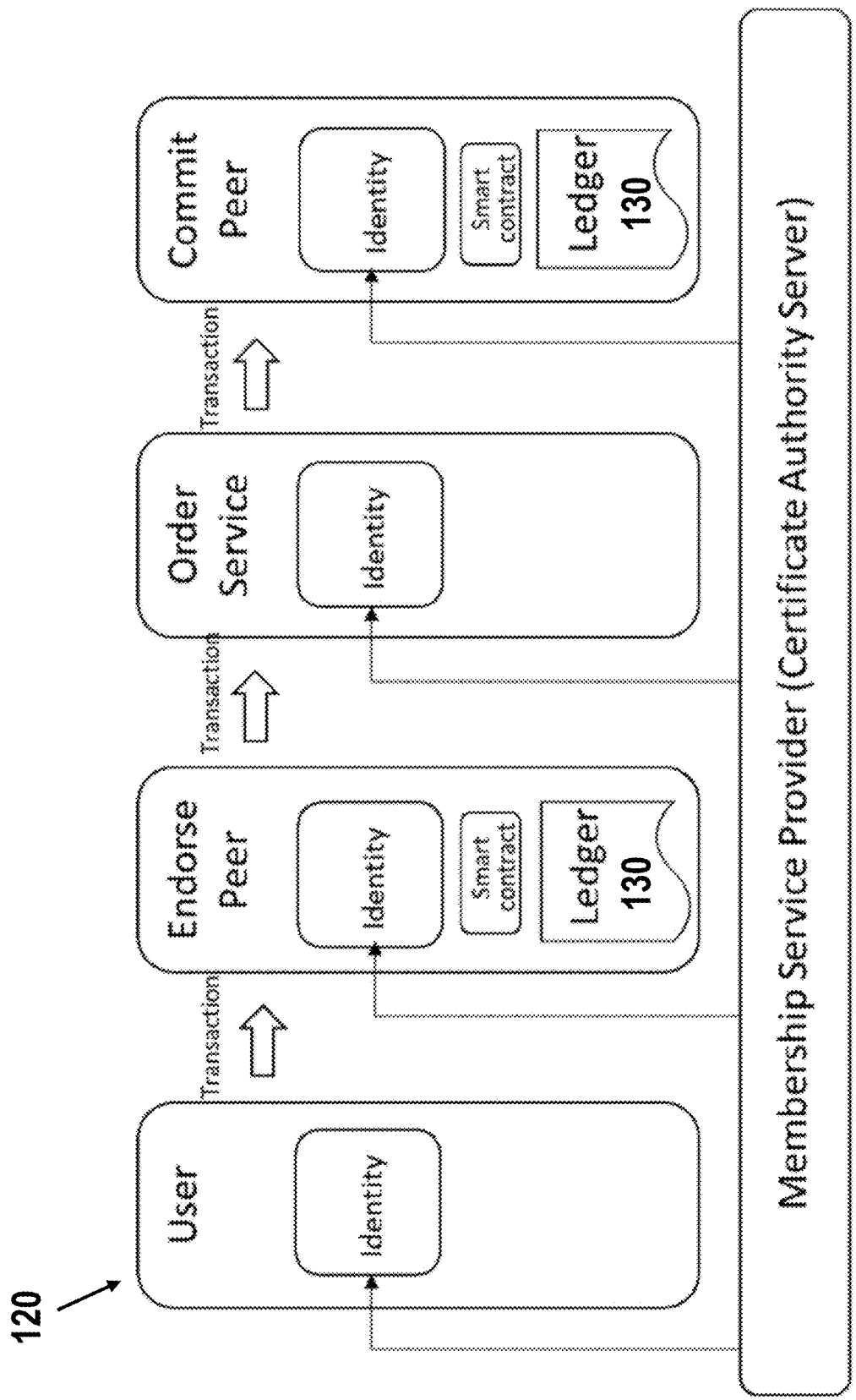
FIG. 5 is a simplified block diagram illustrating an architecture for a Blockchain framework (Hyperledger Fabric) which is used to implement the system of FIG. 1.

To implement a key management infrastructure without a centralized entity such as a Centralized Authority, the present system 100 leverages the ledger 130 including dynamic metadata 131 across files and is distributed across all the participating entities in a Blockchain network. Utilizing the same dynamic metadata 131 from the ledger 130 as a shared secret across the network, the central server that traditionally verifies certificates and manages keys can be eliminated. The present system 100 can create the key 180 that can be replaced by utilizing the existing dynamic metadata 131 as a shared key secret without delay caused by exchange with the centralized authority (FIG. 5). When keys are exposed, or certificates expire, the present system 100 can guarantee real-time and automatic key regeneration without exchanging any secrets and without delay caused by the traditional verification process through a central server. Instead, new keys are generated using the dynamic metadata 131 of the ledger 130 as a "shared secret" or seed for key generation.

Some embodiments of the present system 100 are developed using an open-source blockchain framework 120 called Hyperledger Fabric (HLF), which is one of the most promising blockchain platforms led by Linux Foundation and IBM; however, the present system 100 is not limited to only HLF, but can also be applied to other blockchain frameworks 120. HLF is a private, permission-based blockchain network that allows secure identity management using PKI. HLF, whose architecture is shown in FIG. 5, adopts PKI for membership management in the blockchain network. The key pairs and certificates used in all components are derived from Fabric Certificate Authority server. A "peer" is a fundamental element of the network which is provided with a set of APIs (Application Programming Interfaces) that enable administrators and applications to manage the services that they provide. Those APIs for management include endorsing and committing. A "smart contract" defines executable logic that generates new facts that are added to the dynamic metadata 131 of the ledger 130. Users (applications) submit transactions which change the World State recorded in the ledger 130, and the transactions are committed to the blockchain ledger 130 by invoking a smart contract, and the users are notified after the transactions are completed (whether valid or invalid).

Figure 6:
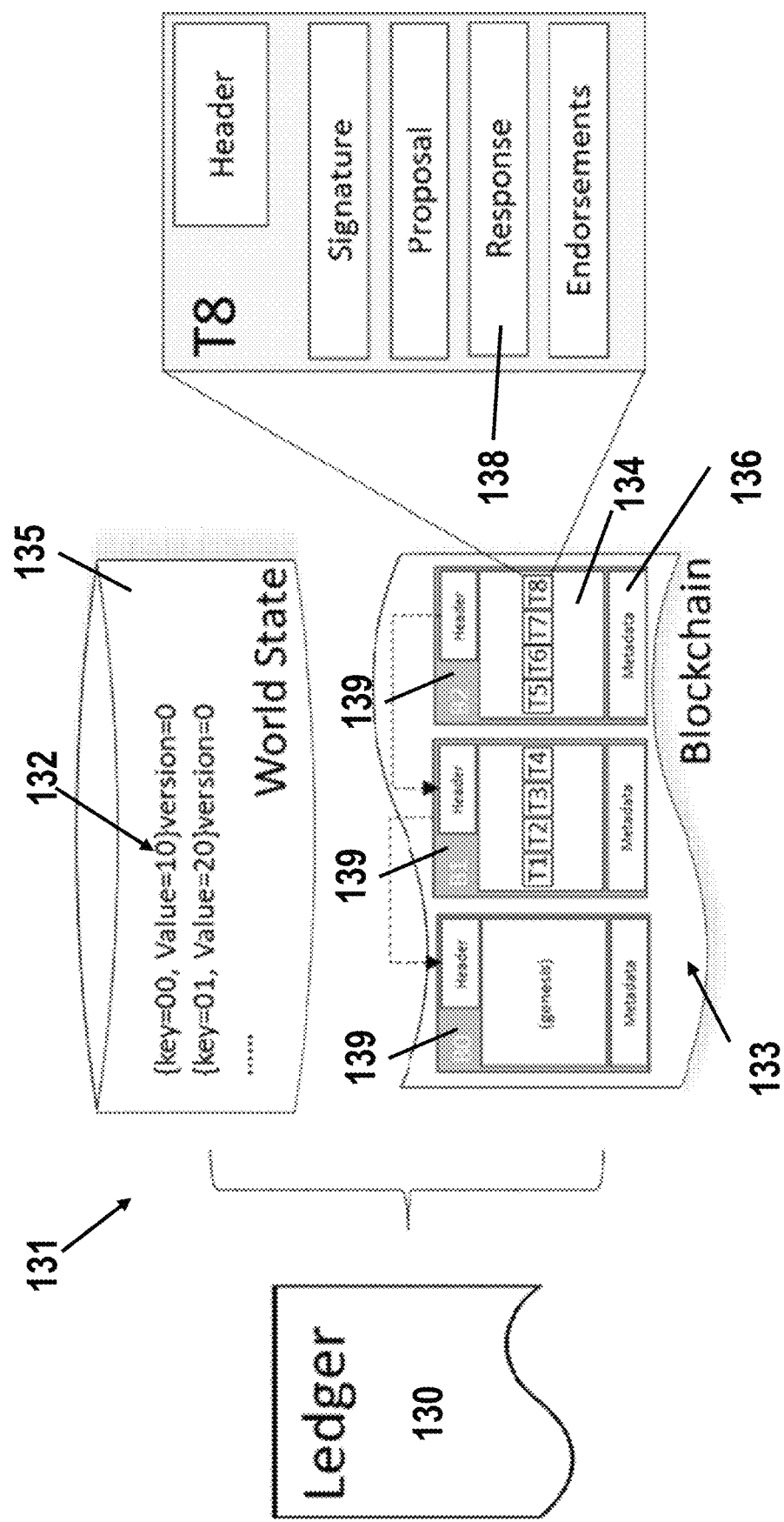
FIG. 6 is a simplified block diagram illustrating the main components of the distributed ledger of the system of FIG. 1.
Figure 8:
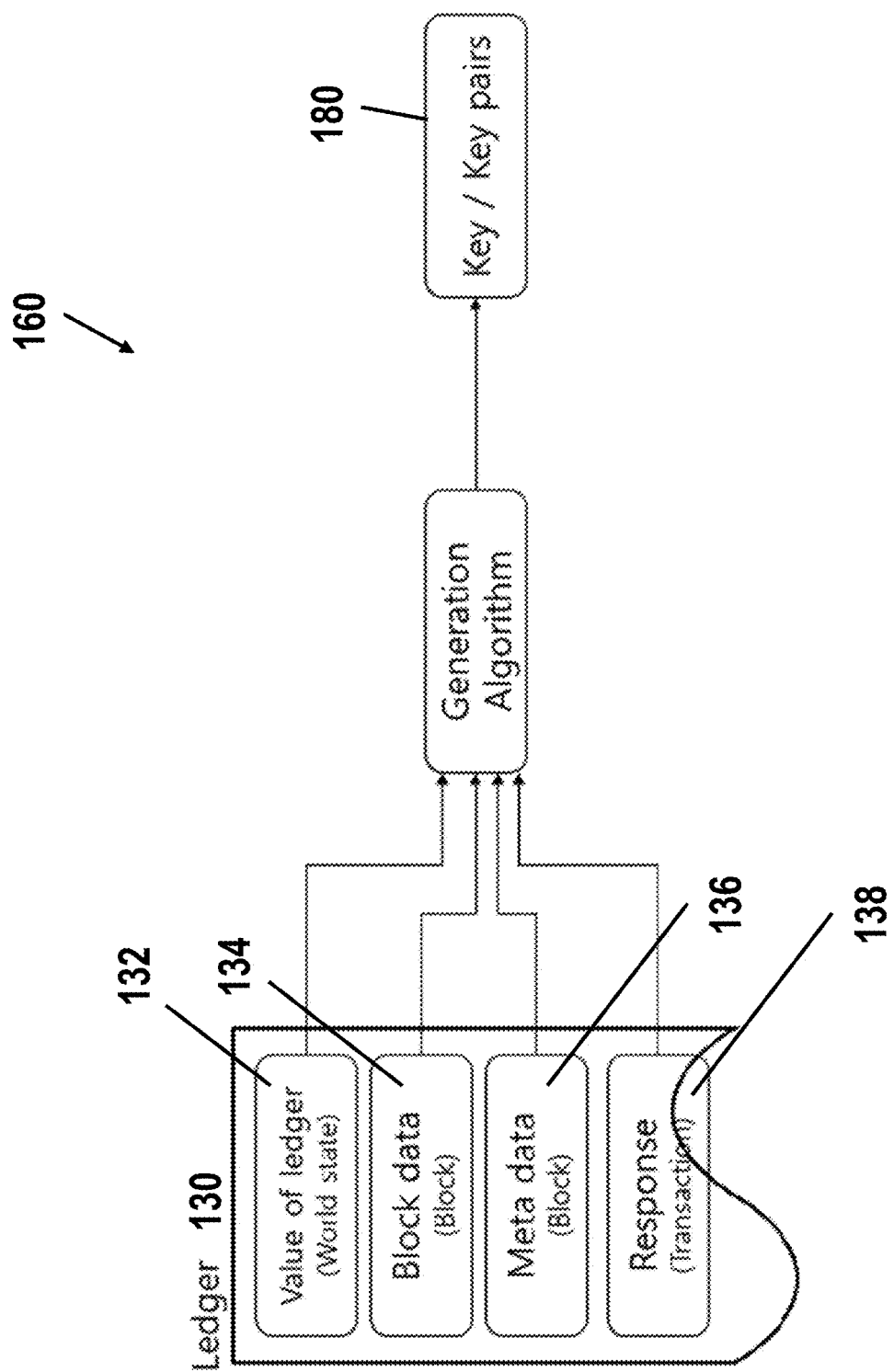
FIG. 8 is a simplified block diagram showing the ledger and various fields within the ledger for selection of a seed for key generation using the system of FIG. 1.

Referring to FIGS. 6 and 8, the ledger 130 includes a "blockchain" 133 and a "World State" 135. The World State 135 represents the current values of each object and is implemented as a database, whereas a blockchain 133 is a detailed transaction log that records all the changes that have resulted in the current World State 135. The blockchain 133 includes a plurality of blocks 139 that each include transaction data for one or more transactions. As transactions are made, new blocks 139 are added to the blockchain 133. The data structure of the blockchain 133 is very different from the World State 135 because once written, the blockchain cannot be modified. Hence, the blockchain 133 is immutable.

FIG. 6 shows ledger states for two keys (00 and 01) and World State values 132 (10 and 20) of the World State 135. The World State 132 represents the current values of all ledger states stored within the ledger 130, Both states are at version 0. The version number is for internal use by the blockchain framework 120 and is incremented every time the state alterations. The version number ensures that the existing World State 135 match the version of endorsement. This process ensures that the World State 135 is changing as expected; that there has not been an unregistered or erroneous update.

For illustration using FIG. 6, let a blockchain contain blocks 139 B0, B1, and B2. B0 is the first block in the blockchain 133, the genesis block. Each block 139 has a respective header, which is a cryptographic hash of all of a plurality of transactions in the block 139 as well as an equivalent hash from the previous block 139. In this way, blocks 139 are inseparably linked to each other. Block data 134 is the segment that includes the transaction information. Block metadata 136 contains the created time of the block, certificate information and signature of the block creator. A transaction in a block 139 includes a header, signature, proposal, response, and endorsements. A header includes essential metadata about the transaction, including the name of relevant chaincode, and its version. A signature is created by a client application. The signature is used to check whether the transaction details have not been tampered with because its generation requires a private key of an application. A proposal programs the input parameters supplied by an application to the smart contract which in turn produces a proposed ledger update. When the smart contract runs, this proposal provides a set of input parameters, which, in combination with the current World State 135, determines the new World State 135. A response 138 includes before and after values of the World State 135 as a Read-Write set (RW-set). Endorsements are a list of signed transaction responses from each required organization to satisfy the endorsement policy.

Fields of the ledger 130 are summarized in Table 1:

TABLE 1

Analyzed Fields in the ledger of HLF Ledger

| World State | | Blockchain | | | |
| --- | --- | --- | --- | --- | --- |
| | | Block | | Transaction | |
| Field | Feature | Field | feature | Field | feature |
| (1) Key | N/U | (1) Header | N/U | (1) Header | N/U |
| (2) Value | N/C | (2) Block data | N/C | (2) Signature | D/U |
| (3) Version | D/C | (3) Metadata | D/C | (3) Proposal | D/C |
| | | | | (4) Response | N/C |
| | | | | (5) Endorsement | D/C |

\* D: Deterministic, N: Non-deterministic feature in terms of the attacker
\* U: Unique data, C: Common shared data The present system 100 selects specific values from the ledger 130 as a seed for key generation. Each field of the ledger 130 is categorized into one of each characteristic: "deterministic" or "non-deterministic" value, and "unique" or "common" shared data. Non-deterministic values can be used as a seed value, as randomness inherent to the non-deterministic values can prevent attackers from predicting the value. In addition, the seed value must be from a value that is shared among all participants in order to act as a "shared secret". Likewise, common shared data is used as a seed for key generations. As a result, the value field 132 in the World State 135, block data 134 and block metadata 136, and the response field 138 in the transaction are used as seeds for key generation.

Key Generation Method

Figure 7:
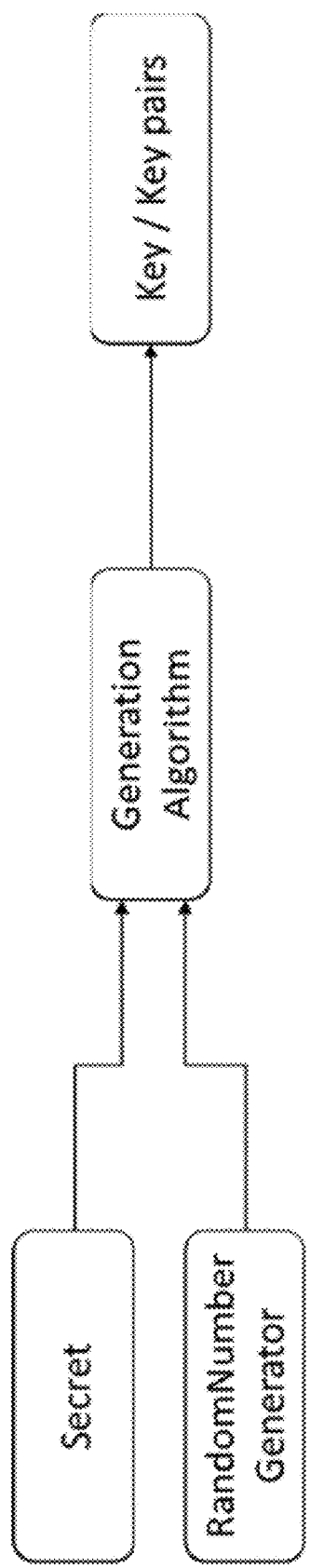
FIG. 7 is a simplified block diagram showing a prior art method of key generation.

Traditionally, a unique seed for the cryptographic key is randomly generated using values by Pseudo-Random Number Generator (PRNG), timestamps, initial vectors, or other arbitrary values such as data from mouse pointer movements to prevent an attacker from predicting the seed, as shown in FIG. 7. However, a seed that is created locally by using any of the methods above is computationally and temporally expensive to securely and quickly regenerate and share across the network.

In contrast, the system 100 uses dynamic metadata 131 from the ledger 130 as seeds for generation of keys 180. Since the dynamic metadata 131 is shared among the participating entities and continuously updated as new transactions are made, the dynamic metadata 131 of the ledger 130 can be used as shared secrets in the present system 100.

As shown in FIGS. 1 and 6, the user 102 submits a transaction to a peer node 110 and the peer node 110 commits the transaction into the ledger 130. Next, the peer node 110 creates (or updates) various values within the ledger 130 including dynamic metadata 131 shown in Table 1 and FIG. 5 based on the transaction submitted by the user 102. Then, based on the requirement of the randomness and commonality, the value field 132 in World State 135, the block data 134 block metadata 136, and the response field 138 from the ledger 130 are considered as potential seeds and a seed is selected from the dynamic metadata 131. In some embodiments, the seed is a combination of one or more of the value field 132 in World State 135, the block data 134, block metadata 136, and the response field 138 from the ledger 130. Finally, using the seed, a key or key pairs 180 are generated by a key generation module 160 which takes the seed value and outputs a key 180 generated using the seed value.

Referring to key generation module 160 of FIG. 2, the keys 180 are generated using a seed selected from the ledger 130. The key generation module 160 may include one or more symmetric-key (SK) and/or public-key (PK) algorithms which take a seed value and output key or key pair 180. In some embodiments, SK key generation algorithms create a single shared key for encryptions of plaintext and decryption of ciphertext. Alternatively, PK key generation algorithms create two related keys: a public key and a private key. PK algorithms tend to be much slower than SK algorithms due to the key exchange and computation cost.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A computer-implemented method for generating a cryptographic key, the computer-implemented method comprising:

storing, in at least two data storage devices, a distributed electronic ledger for a transaction, the distributed electronic ledger comprising one or more dynamic metadata values;

selecting a seed value from the one or more dynamic metadata values inherent to the distributed electronic ledger, wherein the one or more dynamic metadata values are:

non-deterministic; and commonly accessible between each device of the at least two data storage devices; and generating a cryptographic key using the seed value, wherein the seed value includes the one or more dynamic metadata values, wherein the distributed electronic ledger includes:
- a World State, wherein the World State includes a World State value and wherein the World State is updated after a transaction has been recorded in the distributed electronic ledger; and
- a blockchain, wherein the blockchain includes a plurality of blocks, and wherein each block of the plurality of blocks includes data related to one or more transactions recorded in the distributed electronic ledger, wherein the one or more dynamic metadata values inherent to the distributed electronic ledger that are selected as a seed comprise at least one of:
- the World State value representative of current values of all states stored within the electronic ledger as a result of the transaction stored within the distributed electronic ledger;
- a block data value representative of data values stored within a block of the plurality of blocks;
- a block metadata value representative of metadata values stored within a block of the plurality of blocks; and
- a transaction response value representative of before and after values of the World State following the transaction.

2. The method of claim 1, wherein the cryptographic key is generated locally by one of the at least two data storage devices.

3. The method of claim 1, further comprising:
- detecting a threat from an unauthorized entity within a blockchain framework, the blockchain framework comprising the at least two storage devices and the distributed electronic ledger; and
- alerting the at least two data storage devices about the threat from the unauthorized entity.

4. The method of claim 1, wherein the cryptographic key is used to encrypt or decrypt information stored within the distributed electronic ledger.

5. The method of claim 1, wherein the cryptographic key is generated from the seed value using a symmetric-key algorithm or a public-key algorithm.

6. The method of claim 1, further comprising:
constructing a certificate using the seed value.

7. A system comprising:
- a computer-readable memory storing instructions; and
- one or more computer processors in communication with the computer-readable memory, wherein the one or more computer processors are configured to execute the instructions to:
  - store, in at least two data storage devices, a distributed electronic ledger for a transaction, the distributed electronic ledger comprising one or more dynamic metadata values;
  - select a seed value using the one or more dynamic metadata values inherent to the distributed electronic ledger, wherein the one or more dynamic metadata values are:
    - non-deterministic; and
    - commonly accessible between each device of the at least two data storage devices; and
  - generate a cryptographic key using the seed value;

wherein the cryptographic key is generated locally by one or more of the at least two data storage devices wherein the distributed electronic ledger includes:
- a World State, wherein the World State includes a World State value and wherein the World State is updated after a transaction has been recorded in the distributed electronic ledger; and
- a blockchain, wherein the blockchain includes a plurality of blocks, and wherein each block of the plurality of blocks includes data related to one or more transactions recorded in the distributed electronic ledger, wherein the one or more dynamic metadata values inherent to the distributed electronic ledger that are selected as a seed comprise at least one of:
  - the World State value representative of current values of all states stored within the electronic ledger as a result of the transaction stored within the distributed electronic ledger;
  - a block data value representative of data values stored within a block of the plurality of blocks;
  - a block metadata value representative of metadata values stored within a block of the plurality of blocks; and
  - a transaction response value representative of before and after values of the World State following the transaction.

8. The system of claim 7, further comprising:
a monitoring module stored within the computer-readable memory, the monitoring module configured for detecting a threat from an unauthorized entity within a blockchain framework, the blockchain framework comprising the at least two storage devices and the distributed electronic ledger.

9. The system of claim 8, further comprising:
a broadcasting module, the broadcasting module operable for alerting the at least two data storage devices about the threat from the unauthorized entity.

10. The system of claim 7 wherein the cryptographic key is generated from the seed value using a symmetric-key algorithm or a public-key algorithm.

* * * * *